United States Patent [19]

Shinomura et al.

[11] Patent Number: 4,859,535
[45] Date of Patent: Aug. 22, 1989

[54] POROUS HOLLOW-FIBER

[75] Inventors: Yasushi Shinomura; Masahiko Yamaguchi; Koichiro Fukuzaki, all of Ichihara, Japan

[73] Assignee: Ube Industries, Ltd, Ube, Japan

[21] Appl. No.: 209,391

[22] Filed: Jun. 21, 1988

[30] Foreign Application Priority Data

Jun. 26, 1987 [JP] Japan ................................ 62-159095

[51] Int. Cl.$^4$ ........................... D01D 5/12; D02G 3/00
[52] U.S. Cl. ................................ 428/398; 210/500.23; 428/376; 428/401
[58] Field of Search ............... 428/376, 398, 375, 394, 428/401; 210/500.23; 264/41, 145

[56] References Cited

U.S. PATENT DOCUMENTS

| 4,055,696 | 10/1977 | Kamada et al. | 428/398 |
| 4,214,020 | 7/1980 | Ward et al. | 210/500.23 |
| 4,230,463 | 10/1980 | Henis et al. | 55/16 |
| 4,257,997 | 3/1981 | Soehngen et al. | 264/145 |
| 4,290,987 | 9/1981 | Soehngen et al. | 264/41 |
| 4,340,481 | 7/1982 | Mishiro et al. | 210/500 |
| 4,401,567 | 8/1983 | Shindo | 210/500.23 X |
| 4,405,688 | 9/1983 | Lowery et al. | 428/398 |
| 4,654,265 | 3/1987 | Kamei et al. | 210/500.23 X |
| 4,708,800 | 11/1987 | Ichikawa et al. | 428/372 X |
| 4,756,932 | 7/1988 | Puri | 427/354 X |

Primary Examiner—Lorraine T. Kendell
Attorney, Agent, or Firm—Armstrong, Nikaido, Marmelstein, Kubovcik & Murray

[57] ABSTRACT

A porous hollow-fiber formed of polyolefin. The fiber has a peripheral wall constituted by a plurality of relatively large rods, or strands, of the polyolefin which run substantially perpendicularly to the longitudinal direction of the hollow-fiber and a plurality of fine fibrils which extend in the longitudinal direction of the hollow-fiber between adjacent rods and are connected thereto. Groups of rectangular fine pores are formed by the rods and fine fibrils. The hollow-fiber has groups of fine pores having uniform size and configuration and is excellent in selective separation capabilities.

5 Claims, 6 Drawing Sheets

POROUS HOLLOW-FIBER

BACKGROUND OF THE INVENTION

1. Field of the Invention

The present invention relates to a porous hollow-fiber having a multiplicity of fine pores in peripheral walls thereof and having selective separation capabilities. More particularly, the present invention relates to a porous hollow-fiber which is suitable for use in artificial lungs, plasma separation, water purification, and the like.

2. Description of the Related Art

A method of producing a porous film by stretching (drawing) a film of crystalline polyolefin such as polypropylene and forming pores in the film is disclosed in U.S. Pat. No. 3,558,764. In this method, an unstretched film of polypropylene is melted and extruded at a temperature in the range of 10°-40° C. higher than its melting point, and this film is taken up within a take-up ratio (i.e., draft) of 20-180. A film having pores connected to each other therein and having an average pore size of 1,000-2,000 Å is thereby obtained.

Furthermore, a porous polypropylene hollow-fiber and a method of producing the same are proposed in Japanese Patent Publication No. 52123/1981. This publication discloses a porous polypropylene hollow-fiber formed by effecting extrusion at a spinning temperature of 210° C. and taking up the fiber at a draft of 180-600. In the resultant fiber the thickness of a peripheral wall is less than 40 $\mu$m, a multiplicity of fine pores respectively connected to the peripheral wall are present, and a distribution curve of the fine pores has at least one maximum point in a range of 200-1,200 Å, thus, it is possible to obtain a hollow-fiber which is characterized by its gas permeability.

However, in a conventionally known hollow-fiber, the pores in the peripheral wall are extremely nonuniform, and the distribution of the pore size is large, so that the fiber has a large drawback in terms of the selective separation capabilities. In other words, to obtain a porous hollow-fiber having an excellent capability to effect selective separation, the uniformity of the size of the pores is important.

If a polyolefin such as polypropylene is made porous in a conventional method by being fibrillated by stretching, pores are formed by portions whose configuration and size are nonuniform and which form relatively large and meandering meshes and by relatively slender fibrils (hereafter referred to as fine fibrils) which run in these portions substantially parallel to the longitudinal direction of the hollow-fiber.

Thus, the configuration and size of the pores obtained by the known methods are not uniform, and the aforementioned relatively large mesh-like portions form closed circuits. In other words, these portions which form relatively large meshes run in all directions relative to the longitudinal direction of the hollow-fiber, thereby forming continuous, closed circuits, i.e., meshes, which are of various sizes of a dimension substantially equivalent to the length of the aforementioned fine fibrils.

Accordingly, the length of the fine fibrils varies depending on locations, and the distribution of the pore size is therefore wide. Such a porous hollow-fiber having a wide distribution is inferior in terms of the selective separation capabilities.

SUMMARY OF THE INVENTION

Accordingly, an object of the present invention is to provide a porous polyolefin hollow-fiber in which the size of pores is substantially uniform.

Another object of the present invention is to provide a porous polyolefin hollow-fiber which excels in selective separation capabilities.

These and other objects are accomplished in the present invention, by providing a porous hollow-fiber formed of polyolefin, the fiber comprising: a peripheral wall constituted by groups of relatively large rods which run in a direction substantially perpendicularly to the longitudinal direction of the hollow-fiber and by groups of fine fibrils which run in the longitudinal direction of the hollow-fiber between adjacent rods and are connected therebetween, groups of rectangular fine pores being formed by the groups of rods and the groups of fine fibrils; the fiber having a wall thickness thereof being 50-150 $\mu$m, and an inside diameter of 250-1000 $\mu$m, and a pore size measured by a bubble point method of 0.1-1.0 $\mu$m. The peripheral wall means wall ranging from an inner wall surface of the hollow-fiber to an outer wall surface of the fiber.

The above and other objects, features and advantages of the present invention will become apparent from the following description of the invention when read in conjunction with the accompanying drawings.

DETAILED DESCRIPTION OF THE INVENTION

Figure 1:
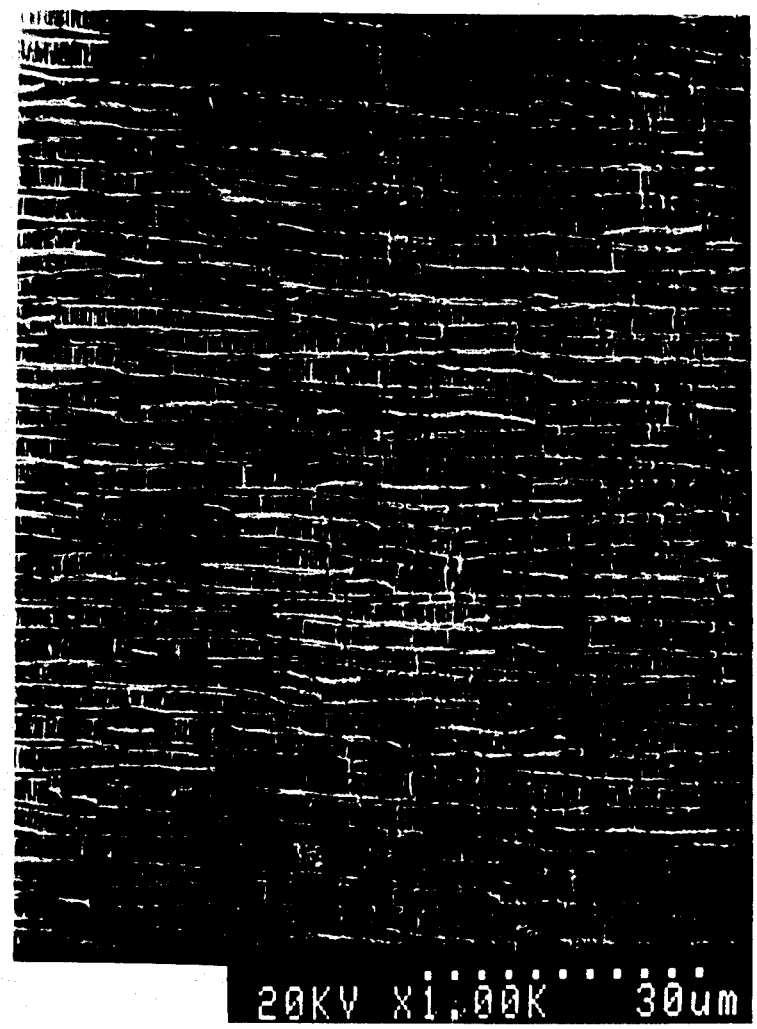
FIG. 1 is an electron microscope photograph (photomicrograph) illustrating the configuration of an outer wall surface of a porous hollow-fiber, i.e., an example of the present invention.
Figure 2:
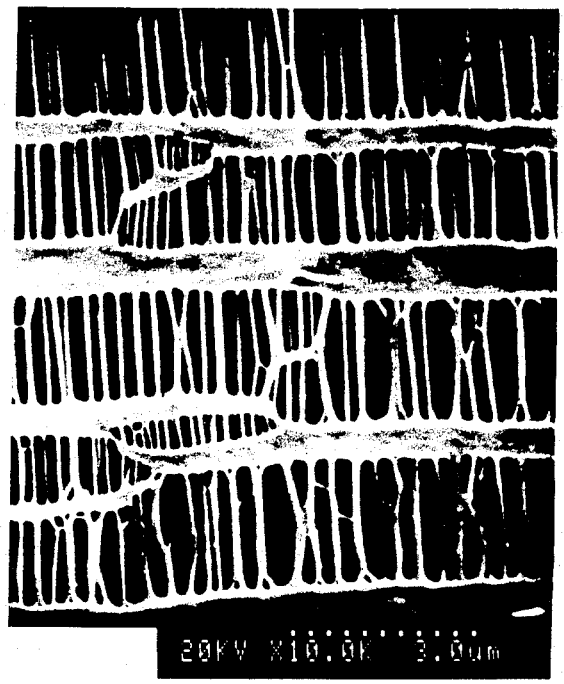
FIG. 2 is a further enlarged electron microscope photograph of the configuration of the outer wall surface of the porous hollow-fiber thereof.
Figure 3:
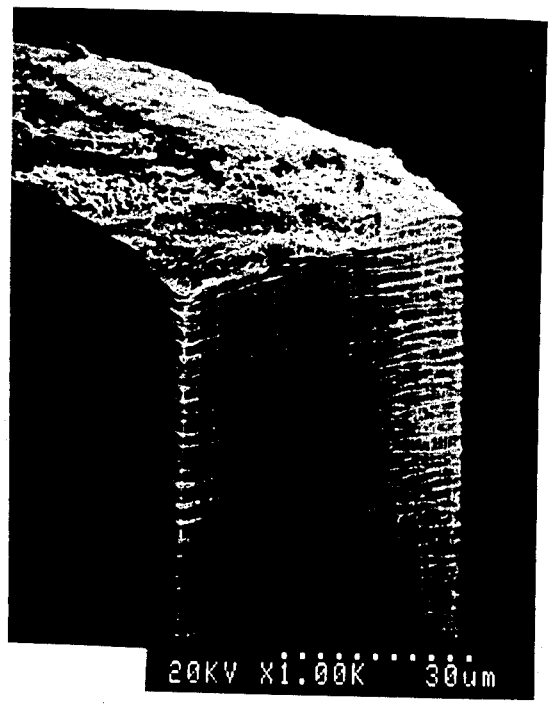
FIG. 3 is an electron microscope photograph of the configuration of a portion of the porous hollow-fiber and its cross section.

In a preferred form of the present invention, a group of rods, or strands, or plates, of the polyolefin runs substantially perpendicularly to the longitudinal direction of a hollow-fiber, and the rods form closed circuits at a length three times or more the average length ($\bar{d}$) of fine fibrils of the polyolefin formed between the rods (see FIGS. 1, 2 and 3 in which the longitudinal direction of the fiber is the vertical direction of the photomicrographs; the "rods" extending in the horizontal direction in the photomicrographs and the "fibrils" extending in the vertical direction). Preferably, the closed circuits are formed at a length five times or more, more preferably, ten times or more, the average length ($\bar{d}$) of the fine fibrils. The average length ($\bar{d}$) of the fine fibrils is expressed by the average length of 20 fibrils selected arbitrarily from those in the vicinity of an arbitrary point on the rod which is also arbitrarily selected.

In the present invention, by carefully selecting various forming conditions, relatively large rod-shaped portions are formed only perpendicularly to the longitudinal direction of the hollow-fiber. In other words, a special hollow-fiber has been developed in which these relatively large rod-shaped portions are not formed in the longitudinal direction of the hollow-fiber.

In a hollow-fiber prepared in the conventional method, the size of the frames forming the closed circuits varies, and the length of the fine fibrils running therebetween also varies correspondingly. In other words, the sizes of the pores formed in a rectangular shape are nonuniform, and the distribution thereof is very wide.

The hollow-fiber in the present invention has the following physical properties: A film or wall thickness of 50–150 μm, preferably 10–100 μm; an inside diameter of 250–1000 μm, preferably 270–400 μm; and a pore diameter when measured by a bubble point method of 0.1–1.0 μm, preferably 0.2–0.5 μm.

If a hollow-fiber having such physical properties is used in an artificial lung, it is possible to obtain an artificial lung whose gas replacing capabilities (oxygenating capabilities and carbonic acid gas replacing capabilities) are excellent and in which leakage of plasma does not occur for a long period of time even if the area of the membrane is small.

In addition, when such a hollow-fiber is used for other purposes, e.g., plasma separation and water purification, because the sizes of the pores of the hollow-fiber are uniform, it is possible to obtain excellent capabilities of selective separation.

In the present invention, the aforementioned rods preferably form closed circuits with a length three times or more the average length ($\bar{d}$) of the fine fibrils with an arbitrary point on the rod set as a starting point (this average length being expressed by the average length of 20 fiber fibrils selected arbitrarily from an area surrounding that starting point). In other words, this means that the length of the fine fibrils in the aforementioned range is substantially constant.

In addition, in the present invention, it is preferred that the sides (t) of the rods is within the range of 0.1 μm–40 μm, and that the following relationship holds between the size (t) of the rods and the size ($\Delta l$), i.e., thickness, (see FIG. 2), of the fine fibrils:

$$3\Delta l \leq t \leq 400\Delta l$$

Here, if t is smaller than $3\Delta l$, then the strength is insufficient, while if it is larger than $400\Delta l$, the porosity declines, and the separating capabilities disadvantageously decline.

It should be noted that the "rod" referred to in the present invention means a form exhibited on an outer wall surface of the hollow-fiber (see FIGS. 1 and 2), and does not particularly mean a "bar-shaped" configuration. The horizontal cross section of the hollow-fiber has a form as shown in an upper portion of the hollow-fiber illustrated in FIG. 3 (which is an electron microscope photograph illustrating a portion of the hollow-fiber and its cross-section). Specifically, the upper portion of the hollow-fiber shown in the figure is a horizontal cross-section, i.e., cross-section perpendicular to the longitudinal direction, of the hollow-fiber, a lower right-hand portion of the hollow-fiber shown in the figure is a vertical cross section, i.e., cross-section in the longitudinal direction, of the hollow-fiber, and the lower left-hand portion of the hollow-fiber illustrated in the figure illustrates an inner wall surface of the hollow-fiber. Accordingly, the "size of the rod" referred to in the present invention means the "size", i.e., thickness, shown by the outer wall surface of the hollow-fiber. As is apparent from FIG. 3, the form of the "rod" in both the inner wall surface and the vertical cross section is similar to that in the outer wall surface.

The hollow-fiber of the present invention, when used as a plasma separating membrane, has a ratio of the average length ($\bar{d}$) of the fibril to the average interval (l) between the fibrils, ($\bar{d}$/l), in the range of 2–60, preferably 5–30, with l being preferably in the range of 0.02 μm–1 μm, preferably 0.05 μm–0.8 μm. If l is smaller than 0.02 μm, the filtration speed of plasma is slow, while, if it exceeds 1 μm, erythrocytes are filtered together with the plasma. To meet these values, it suffices to appropriately change the forming conditions including the percent of stretch and stretching temperature, and adjustment thereof can be effected readily.

Furthermore, in the hollow-fiber of the present invention, if at least a part of the peripheral wall surface of the fiber and the inner surfaces of the fine pores is covered with glycerine fatty acid ester, the hydrophilic nature of the hollow-fiber improves remarkably, and can be used suitably as a precision filter or an ultrafilter for filtering water or an aqueous solution.

As the fatty acid components of glycerine fatty acid ester, it is possible to use caprylic acid, capric acid, lauric acid, palmitic acid, stearic acid, oleic acid, behenic acid, and the like. In addition, any one of a monoglyceride, a diglyceride, and a triglyceride or a combination thereof can be used as the glycerine fatty acid ester which is produced as a result of reaction between these acid components and glycerine.

As shown in FIG. 3, in wall portions constituting the peripheral walls of the porous hollow-fiber of the present invention, fine fibrils extend between adjacent rods which run substantially in parallel to each other. In other words, in FIG. 3, the rods do not form closed circuits over distances of $50\bar{d}$ or more with respect to the average length ($\bar{d}$) of the fine fibrils. This means that the porosity is improved remarkably, and, to put it differently, this means that the performance of identical areas of the fiber is improved remarkably.

The methods of producing the porous hollow-fiber of the invention are described hereafter.

The inventors have determined that it is important to make the straining rate relatively low when stretching (drawing) the hollow-fiber, in order to obtain a porous hollow-fiber in which the size of pores is uniform.

The porous hollow-fiber can be produced by a first method in which, after the melt-spun hollow-fiber is first stretched (drawn) in a medium, e.g., liquid nitrogen, at a low-temperature, it is then subjected to a stretching (drawing) process at a high-temperature, e.g., at a range of 110°–155° C. and in a straining rate of less than 22.0%/min., preferably a range of 8–18%/min. The fiber can also be produced by a second method in which the melt-spun hollow-fiber is subjected to stretching (drawing) at a straining rate of less than 10%/min, which is lower than that of the first method, at a high-temperature of 120°–145° C., preferably 130–140° C., without stretching (drawing) step at a low-temperature. Similar methods can also be used.

In other words, in the second method which does not stretch a hollow-fiber at a low-temperature, the straining rate in the stretching process is lower than that of the first method which stretches the hollow-fiber at a low-temperature.

It is assumed that in the first method, the initial low-temperature stretching causes the formation of uniform fine pores on the hollow-fiber and the subsequent stretching step broadens the fine pores and, to the contrary, in the second method, it is necessary to lower the straining rate since a high-temperature stretching is conducted without previously forming uniform fine pores.

In the above-described methods, if the straining rate is over a certain value, only a porous hollow-fiber having small pores can be obtained.

The percent of stretch (draw ratio) can be altered in accordance with the average pore size corresponding to the desired use of the porous hollow-fiber. The percent of stretch (draw ratio) is set to 100–700%, preferably 150–600%, with respect to the initial length of the unstretched hollow-fiber. If the percent of stretch exceeds 700%, the hollow-fiber can break, which is undesirable.

The porous hollow-fiber formed by the aforementioned stretching process is then preferably subjected to heat treatment. This heat treatment has as its main purpose to thermally fix the hollow-fiber to maintain the pores formed in the stretching process. This heat treatment is performed by a method in which the porous hollow-fiber is heated for three minutes or more in air heated to a temperature of about 110°–155° C. while maintaining the stretched condition.

When at least a part of the surface of the peripheral wall and the inner surfaces of the fine pores of the porous hollow-fiber of the present invention are coated with glycerine fatty acid ester, the following method is used.

The aforementioned glycerine fatty acid ester is dissolved in a solvent in such a manner that the concentration thereof becomes 0.1–10 parts by weight of the solvent. As the solvent, an alcohol such as methanol and ethanol, acetone, benzene, toluene, xylene, chloroform, and similar solvents for the glycerine fatty acid ester can be used.

Subsequently, the porous hollow-fiber is immersed in the glycerine fatty acid ester solution thus obtained, and after the glycerine fatty acid ester solution has sufficiently permeated the fine pores of the porous hollow-fiber, the porous hollow-fiber is allowed to dry to remove the solvents, thereby obtaining the porous hollow-fiber with the glycerine fatty acid ester coated thereon.

As for the polyolefin useful in producing the porous hollow-fiber of the present invention, a crystalline polyolefin such as polyethylene, polypropylene, and poly-4-methylpentane is used. In particular, polyethylene or polypropylene is used.

Further, the polyolefin is preferably one having a narrow molecular weight distribution. A polyolefin having a ratio of weight average molecular weight (Mw) to number average molecular weight (Mn), (Mw/Mn), of not more than 7, is preferably used.

A description will now be given of a method of measuring the pore size in accordance with the bubble point method.

The bubble point method is described by the American Society of Testing Materials (A.S.T.M.)(ASTM F316), and is used to determine the maximum pore size of a fine porous material (in this case, a hollow-fiber).

In the method air pressure is gradually applied to the inside of the hollow-fiber wetted in a solvent and the maximum pore size is determined from the pressure of the bubbles which first come out of the hollow fiber by using the following formula:

$$r = 2\sigma/p$$

where r is a radius (cm) of the maximum pore size, p is pressure (dyne/cm), and $\sigma$ is surface tension (dyne/cm).

It should be noted that the pore size referred to in the present invention is not the maximum pore size but a pore size which is determined from the pressure at which the bubbles appear simultaneously.

A more detailed description of the present invention will now be given on the basis of examples.

EXAMPLE 1

Polypropylene (made by Ube Industries, Ltd., MFI=5g/10 min, Mw/Mn=5.5) was melted and spun by a conventional method using a circular-slit nozzle with a diameter of 30 mm, and the hollow-fiber was spun at a take-up rate of 116 m/min.

After being subjected to heat treatment at 150° C. for five minutes, this hollow-fiber was introduced into a low-temperature bath (liquid nitrogen) at $-196°$ C., and was stretched by 15%. Subsequently, the hollow-fiber was subjected to treatment at a temperature of 150° C. for 45 seconds so as to be thermally fixed, and further subjected to 300% stretching in a medium heated to 135° C. and at a straining rate of 17.3%/min. so as to be fibrillated. Subsequently, the hollow-fiber was then subjected to heat treatment at the same temperature for five minutes by maintaining a constant length.

An electron microscope photograph of an outer wall surface of the hollow-fiber thus obtained is shown in FIG. 1.

Figure 4:
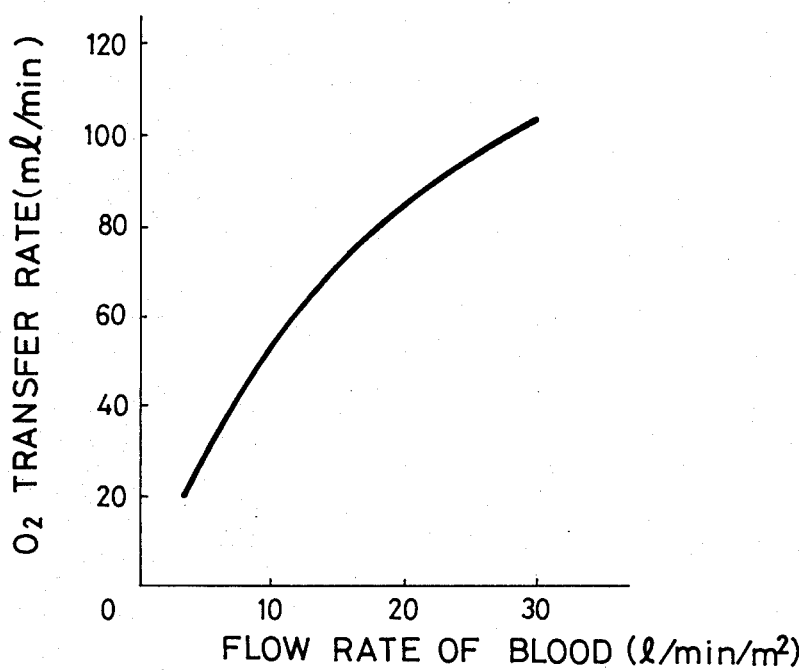
FIG. 4 is a graph illustrating the oxygenating capabilities in an artificial lung in which a porous hollow-fiber in accordance with the present invention is used.
Figure 5:
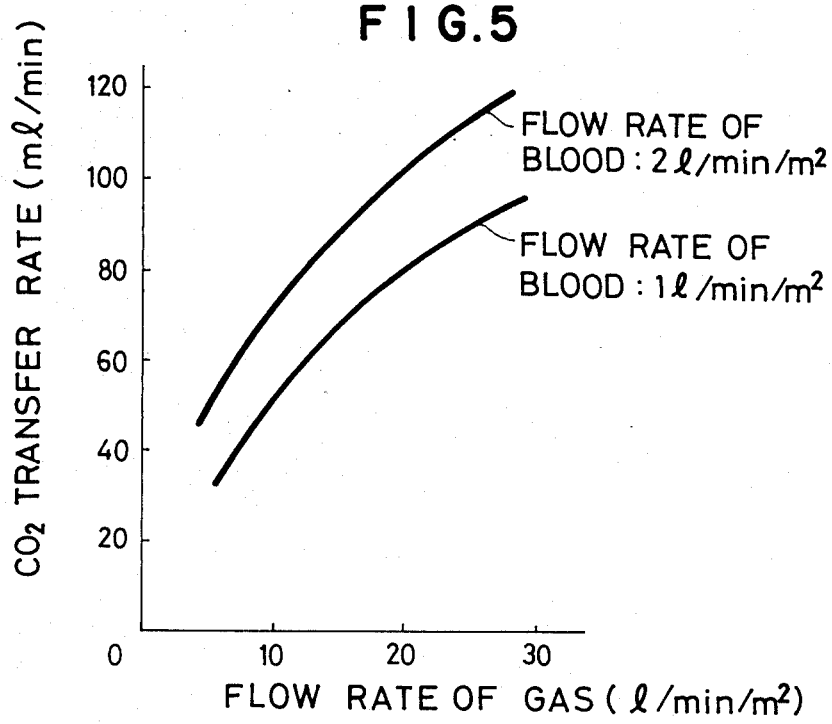
FIG. 5 is a graph illustrating carbonic acid replacing capabilities of a porous hollow-fiber in accordance with the present invention.

This hollow-fiber had an inside diameter of 320 $\mu$m, a wall thickness of 55 $\mu$m, and a pore size of 0.25 $\mu$m (a measurement according to the bubble point method). A hollow-fiber-type artificial lung having a membrane area of 1.3 m$^2$ was prepared using this hollow-fiber. Using a grown-up dog (weight: 9 kg), the canine venous blood was made into the standard venous blood (oxygen saturation: 65$\pm$5%, Pvco: 45$\pm$5 mmHg; value of hemoglobin in blood: 12$\pm$1 g/dl; temperature: 37°$\pm$2° C.) set forth by the Association for the Advance of Medical Instrumentation (A.A.M.I.), and the gas replacing capabilities of the artificial lung were measured by using the venous blood. The results are shown in FIGS. 4 and 5.

EXAMPLE 2

In a manner similar to that of Example 1, a porous polypropylene hollow-fiber was obtained having an inside diameter of 320 $\mu$m, a wall thickness of 55 $\mu$m, a pore size of 0.4 $\mu$m (bubbles were formed simultaneously at an air pressure of 1.5 kg/cm$^2$, using ethanol as a solvent according to the bubble point method). By using this fiber, a hollow-fiber-type artificial lung having a membrane area of 0.5 m$^2$ was prepared, and the heparinized bovine blood was made into the standard blood set forth by the A.A.M.I. Subsequently, when the blood was allowed to flow through the artificial lung for 50 minutes at a flow rate of 1 l/min, practically no decline in the oxygenating capabilities and carbonic gas replacing capabilities was observed, and no serum leakage was observed.

EXAMPLE 3

An examination and measurement were conducted with respect to the relationship between serum leakage time and pore size of a porous polypropylene hollow-fiber prepared in a manner similar to that of Example 1 (in this case as well, the bovine blood was used in the same way as Example 2). The results are shown in Table 1.

TABLE 1

| Pore diameter ($\mu$m) | Pressure at which bubbles appear simultaneously (kg/cm$^2$) | Serum leakage time (hour) |
| --- | --- | --- |
| 0.05 | 13 | 25 |
| 0.09 | 7 | 39 |
| 0.20 | 3 | not less than 50 |
| 0.30 | 2 | not less than 50 |

Polyurethane resin was used as a potting material (adhesives).

It can be seen from this result that, when the porous hollow-fiber had a pore diameter of 0.2 $\mu$m or more and a thickness of 50 $\mu$m or more, serum leakage did not occur within a short time, and that practically no leakage occurred after sterilization.

EXAMPLE 4

Polypropylene (brandname: UBE-PP-J109G made by Ube Industries Ltd., MFI=9 g/10 min, Mw/Mn=6) was spun under the conditions of a spinning temperature of 210° C., a drawing rate of 200 m/min, and a draft ratio of 726 by using a hollow-fiber producing nozzle provided with a gas supplying pipe having a diameter of 8 mm and an inside diameter of 7 mm.

The polypropylene hollow-fiber thus obtained was subjected to heating treatment for six minutes in a heated air oven held at 145° C., and was then stretched in liquid nitrogen ($-195$° C.) by 20% with respect to the initial length. Subsequently, the polypropylene hollow-fiber was subjected to heat treatment for two minutes in a heated air oven held at 145° C. with the stretched state maintained.

Figure 6:
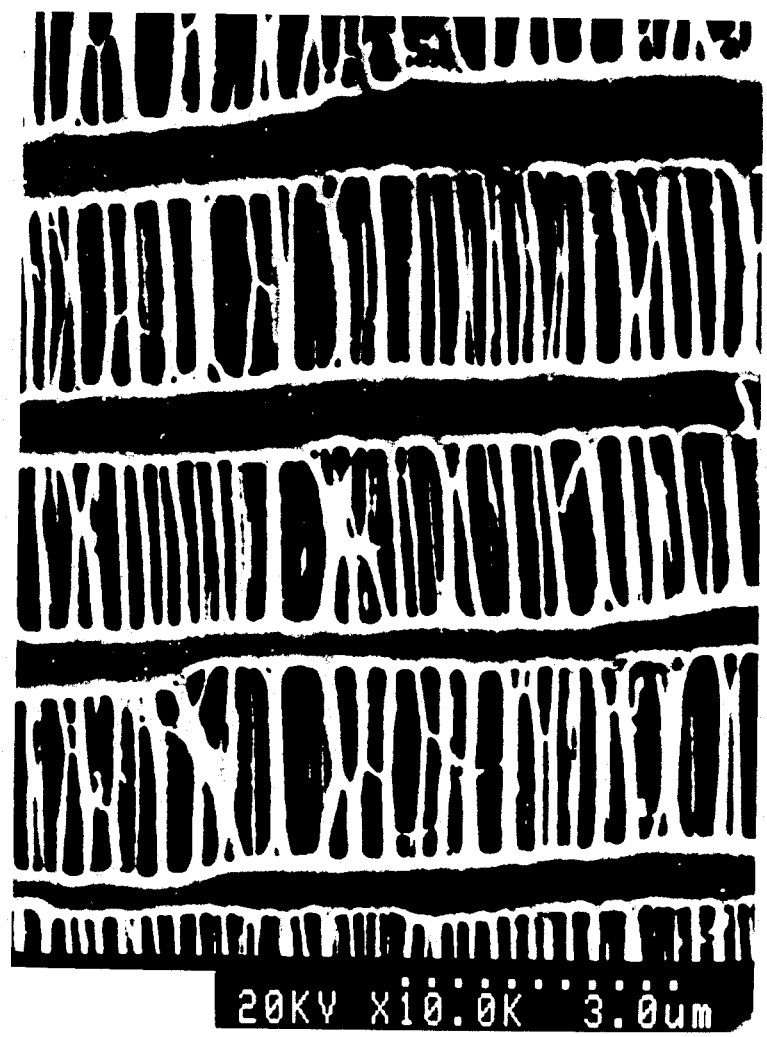
FIG. 6 is an electron microscope photograph illustrating the configuration of an outer wall surface of the porous hollow-fiber in accordance with another embodiment of the present invention.

After this hollow-fiber was subjected to hot stretching by 380% in an atmosphere of air at 140° C. and in a straining rate of 17.3%/min, the hollow-fiber was subjected to heat treatment in a heated air oven at 145° C. for five minutes while maintaining the stretched state, thereby producing the porous polypropylene hollow-fiber. The porous polypropylene hollow-fiber had an inside diameter of 320 $\mu$m, a wall thickness of 55 $\mu$m, and a pore size of 0.54 $\mu$m (measured by the bubble point method). An electron microscope photograph of the outer wall surface of this porous hollow-fiber is shown in FIG. 6.

A plasma separator with a membrane area of 0.5 m$^2$ was prepared by using this fiber, and a plasma separation test was conducted on a grown-up mongrel weighing 10.4 kg.

The results were as follows: The seiving coefficient (SC) of total proteins (TP) in plasma was 0.94 as a value of 120 minutes, SC of plasma albumin was 0.96 as a value of 120 minutes, and SC of total cholesterol was 0.91 as a value of 120 minutes.

In addition, SC of IgG was 1.0 as a value of 120 minutes, while the transmembrane pressure TMP [(module inlet pressure+module outlet pressure)/2 —filtered solution-side pressure] was 30 mmHg or less throughout the plasma separation test (three hours). The amount of filtration was 4.9 l/hr/m$^2$ as a value of 120 minutes.

Furthermore, using the same module as the one used in the aforementioned plasma separation test on the grown-up dog, preserved human blood was allowed to flow into the module by means of a blood pump with the outlet side of the module clamped, and the presence or absence of hemolysis due to a change in the pressure (transmembrane pressure TMP) at that time was observed visually.

The pressure under which hemolysis started was 260 mmHg—416 mmHg in six examples. This represents a high level of hemolysis resistance as compared with a conventional plasma separating membrane.

EXAMPLE 5

Polypropylene (brandname: UBE-PP-J109G made by Ube Industries, Ltd., MFI=9 g/10 min, Mw/Mn=6) was spun under the conditions of a spinning temperature of 200° C. and a drawing rate of 116 m/min by using a hollow-fiber producing nozzle provided with a gas supplying pipe having a diameter of 33 mm and an inside diameter of 27 mm, thereby obtaining polypropylene hollow-fiber.

The polypropylene hollow-fiber thus obtained was subjected to a heat treatment for six minutes in a heated air oven held at 145° C., and was then stretched in liquid nitrogen ($-195$° C.) by 20% with respect to the initial length. Subsequently, the polypropylene hollow-fiber was subjected to heat treatment for two minutes in a heated air oven held at 145° C. with the stretched state maintained.

After this, the polypropylene hollow-fiber was subjected to hot stretching by 400% in an atmosphere of air at 125° C., and in a straining rate of 17.3%/min and was subjected to thermal fixing in a heated air oven at 145° C. for 15 minutes with the stretched state maintained, thereby producing the porous polypropylene hollow-fiber.

The porous polypropylene hollow-fiber thus obtained displayed an average pore size of 0.25 $\mu$m and a porosity of 70%.

EXAMPLE 6

Polypropylene (brandname: UBE-PP-J109G made by Ube Industries, Ltd., MFI=9 g/10 min, Mw/Mn=6) was melted and spun by a conventional method using a circular-slit nozzle with a diameter of 30 mm, and the hollow-fiber was spun at a take-up rate of 116 m/min.

After being subjected to heat treatment in a heated air oven at 145° C. for five minutes, this hollow-fiber was stretched by 280% with respect to the initial length at a temperature of 135° C. and a straining rate of 8.33%/min. The hollow-fiber was then subjected to heat treatment in a heated air oven at 145° C. for five minutes with the stretched state maintained, thereby producing the porous polypropylene hollow-fiber.

Figure 7:
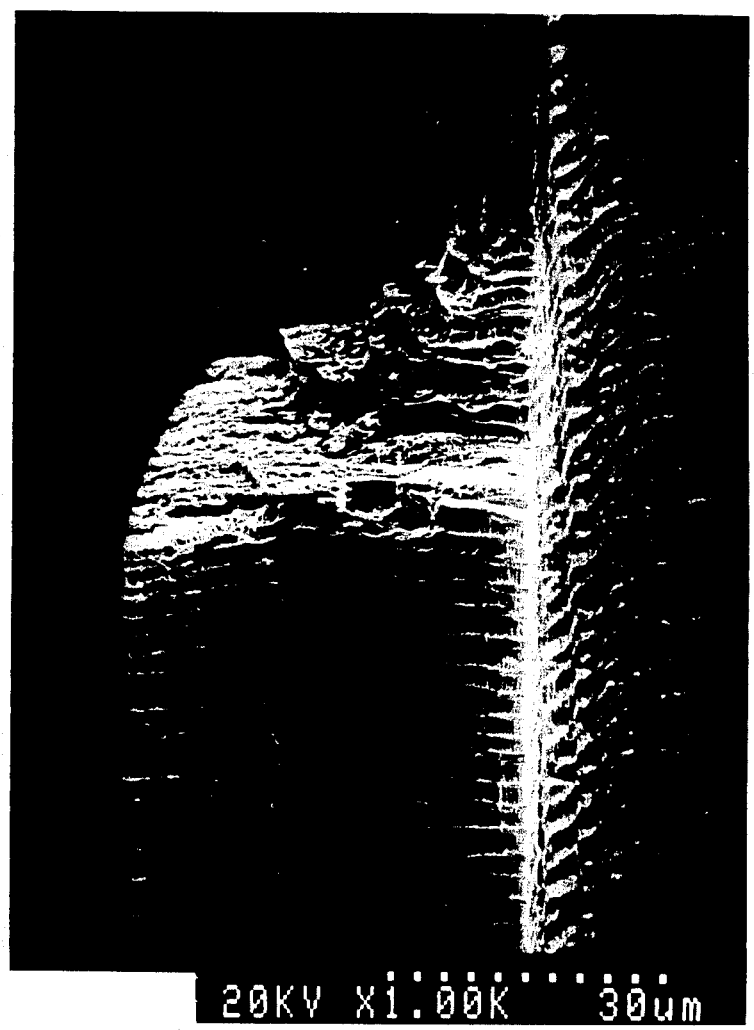
FIG. 7 is an electron microscope photograph illustrating the configuration of the outer wall surface of the porous hollow-fiber in accordance with still another embodiment of the present invention.

An electron microscope photograph of the outer wall surface of the hollow-fiber thus obtained is shown in FIG. 7. This hollow-fiber had an inside diameter of 320

μm, a wall thickness of 55 μm, and a pore size of 0.2 μm (a measurement according to the bubble point method).

EXAMPLE 7

2,400 pieces of the porous polypropylene hollow-fiber of Example 6 were loaded in housing having an inside diameter of 45 mm, an outside diameter of 52 mm, and a length of 380 mm, and opposite end portions thereof were fixed by a potting material. Subsequently, the central portion of the parts at the end portions of the bundle of the hollow-fiber adhered and secured by the potting material were cut perpendicularly to the longitudinal direction of the bundle of the hollow-fiber and were laid open.

Using the hollow-fiber module thus prepared, a bacteria challenge test was conducted. As the challenging bacteria, *Serratia marcescens, Preseudomonas diminuta,* and *Mycoplasma laidlawii* were used.

As for the test, in the case of *S. marcescens* and *P.diminuta,* the module was sterilized by steam under high pressure and was washed with a sterilizing physiological saline solution (5 l). Subsequently, the sterilizing physiological saline solution was further allowed to flow through the module, and the sterilizing characteristics of the module was verified. Then, a physiological saline solution prepared by being sterilized to $10^{7-8}$ org/ml was filtered with the module, and the number of live organisms in the filtered solution was measured. Trypticase soy agar was used for the measurement of the number of the live organisms. The organism eliminating capabilities are expressed by LRV, which is an abbreviation of a log reduction value.

In addition, in the case of *Mycoplasma laidlawii,* the module was subjected to sterilization treatment in the same way as described above, and verification of the sterilizing characteristics was carried out by a direct method by using mycoplasma broth. A physiological saline solution prepared by being sterilized to $10^4$ org/ml was filtered with the module, and the number of live organisms in the filtered solution was measured (direct method). The organism eliminating capabilities are expressed by LRV.

The results of the above-described challenge test were as follows:

| Challenging bacteria | LRV |
|---|---|
| *Serratia marcescens* | LRV 12.2< |
| *Preseudomonas diminuta* | LRV 12.2< |
| | LRV 11.4< |
| *Mycoplasma laidlawii* | LRV 10.1< |

As has been described above, the porous hollow-fiber in accordance with the present invention has a uniform pore size and excels in selective separating capabilities. Accordingly, by using this porous hollow-fiber, it is possible to provide a hollow-fiber module suitable for applications in artificial lungs, plasma separation, water purification, and the like.

What is claimed is:

1. A porous hollow-fiber formed of polyolefin, said fiber comprising:
    a peripheral wall constituted by a plurality of relatively large rods of the polyolefin which extend in a direction substantially perpendicular to the longitudinal direction of the hollow-fiber and a plurality of fine fibrils which extend in the longitudinal direction of said hollow-fiber between adjacent rods and are connected thereto, said plurality of rods and plurality of fine fibrils connected thereto forming rectangular fine pores in said wall; the wall thickness being 50–150 μm, the inside diameter of said fiber being 250–1000 μm, and the pore size measured by a bubble point method being 0.1–1.0 μm.

2. A porous hollow-fiber according to claim 1, wherein adjacent rods are joined at ends thereof and form closed circuits extending over a length three times or more an average length (d) of said fine fibrils.

3. A porous hollow-fiber according to claim 1, wherein the size (t) of each of said rods is in the range of 0.1 μm–40 μm, and the following relationship holds between said size (t) of said rod and a size (Δl) of said fibrils:

$$3\Delta l \leq t \leq 400\Delta l$$

4. A porous hollow-fiber according to claim 1, wherein a ratio of an average length (d) of said fine fibrils to an average interval (l) between adjacent fibrils is in the range of 2–60, and (l) is in the range of 0.02 μm–10 μm.

5. A porous hollow-fiber according to claim 1, wherein at least a part of surfaces of said peripheral wall and of the inner surfaces of said fine pores is coated with glycerine fatty acid ester.-fiber,

* * * * *

UNITED STATES PATENT AND TRADEMARK OFFICE
CERTIFICATE OF CORRECTION

PATENT NO.    :   4,859,535
DATED         :   August 22, 1989
INVENTOR(S)   :   SHIMOMURA et al It is certified that error appears in the above-identified patent and that said Letters Patent is hereby corrected as shown below:

On the cover page, above Item [54], "Shinomura et al" should read --Shimomura et al--;

Item [75], "Shinomura;" should read --Shimomura;--.

Signed and Sealed this

Fourteenth Day of August, 1990

Attest:

HARRY F. MANBECK, JR.

*Attesting Officer*           *Commissioner of Patents and Trademarks*